United States Patent
Chau

(10) Patent No.: US 11,954,724 B2
(45) Date of Patent: Apr. 9, 2024

(54) SYSTEM AND RELATED METHODOLOGY OF USING VEHICLE DATA IN CONNECTION WITH THE SALE OF A VEHICLE

(71) Applicant: Innova Electronics Corporation, Irvine, CA (US)

(72) Inventor: Hoa Khanh Chau, Irvine, CA (US)

(73) Assignee: Innova Electronics Corporation, Irvine, CA (US)

( * ) Notice: Subject to any disclaimer, the term of this patent is extended or adjusted under 35 U.S.C. 154(b) by 38 days.

(21) Appl. No.: 17/229,192

(22) Filed: Apr. 13, 2021

(65) Prior Publication Data

US 2022/0327607 A1 Oct. 13, 2022

(51) Int. Cl.
G06Q 30/06 (2023.01)
G06Q 30/0601 (2023.01)
G07C 5/08 (2006.01)

(52) U.S. Cl.
CPC ....... G06Q 30/0641 (2013.01); G07C 5/0808 (2013.01)

(58) Field of Classification Search
None
See application file for complete search history.

(56) References Cited

U.S. PATENT DOCUMENTS

| | | | |
|---|---|---|---|
| 6,807,469 B2 | 10/2004 | Funkhouser et al. | |
| 6,925,368 B2 | 8/2005 | Funkhouser et al. | |
| 7,603,293 B2 * | 10/2009 | Chenn | G06Q 30/0609 705/26.1 |
| 7,620,484 B1 | 11/2009 | Chen | |
| 8,019,503 B2 | 9/2011 | Andreasen et al. | |
| 8,032,419 B2 | 10/2011 | Chenn | |
| 8,200,543 B2 * | 6/2012 | Varadarajan | G06Q 30/0609 705/26.1 |
| 8,370,018 B2 | 2/2013 | Andreasen et al. | |
| 8,909,416 B2 | 12/2014 | Chen et al. | |
| 9,026,400 B2 | 5/2015 | Chen et al. | |
| 9,177,428 B2 * | 11/2015 | Nguyen | G07C 5/0808 |

(Continued)

FOREIGN PATENT DOCUMENTS

| | | | | |
|---|---|---|---|---|
| WO | WO-2007001914 A2 * | 1/2007 | ............ | G06Q 30/06 |
| WO | WO-2015100278 A1 * | 7/2015 | ............ | G07C 5/008 |

*Primary Examiner* — Nicholas D Rosen
(74) *Attorney, Agent, or Firm* — Stetina Brunda Garred & Brucker

(57) ABSTRACT

A system for use with a handheld electronic device for coordinating retrieval of diagnostic information from a vehicle includes computer readable instructions downloadable onto the handheld electronic device for configuring the handheld electronic device to receive a request signal from a scheduling server. The request signal includes vehicle information of a third-party vehicle for which retrieval of diagnostic information has been requested. The computer readable instructions further configure the handheld electronic device to display information related to the received request signal on the handheld electronic device and receive user input representative of the user agreeing to retrieve the diagnostic information from the third-party vehicle. The computer readable instructions additionally configure the handheld electronic device to send an accept signal to the scheduling server in response to receipt of the user input.

20 Claims, 6 Drawing Sheets

(56) References Cited

U.S. PATENT DOCUMENTS

| | | | |
|---|---|---|---|
| 9,646,432 B2 | 5/2017 | Madison et al. | |
| 10,109,119 B2* | 10/2018 | Keane | G07C 5/0808 |
| 10,600,096 B2* | 3/2020 | McQuade | G06Q 30/08 |
| 10,643,403 B2 | 5/2020 | Madison et al. | |
| 2007/0016483 A1* | 1/2007 | Chenn | G06Q 30/0609 |
| | | | 705/26.1 |
| 2008/0103785 A1* | 5/2008 | Logan | G06Q 30/012 |
| | | | 705/302 |
| 2012/0109780 A1* | 5/2012 | Varadarajan | G06Q 30/0601 |
| | | | 705/26.41 |
| 2012/0136527 A1* | 5/2012 | McQuade | G06Q 30/08 |
| | | | 705/26.4 |
| 2013/0191075 A1* | 7/2013 | Underdal | A61B 5/486 |
| | | | 600/300 |
| 2013/0297143 A1 | 11/2013 | Chen et al. | |
| 2016/0078695 A1* | 3/2016 | McClintic | G07C 5/0816 |
| | | | 701/29.4 |
| 2016/0328890 A1* | 11/2016 | Keane | G07C 5/008 |
| 2019/0304208 A1 | 10/2019 | Chen et al. | |
| 2019/0304213 A1 | 10/2019 | Chen et al. | |
| 2021/0398363 A1* | 12/2021 | Olalere | G06Q 10/20 |

\* cited by examiner

SYSTEM AND RELATED METHODOLOGY OF USING VEHICLE DATA IN CONNECTION WITH THE SALE OF A VEHICLE

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to a system which facilitates retrieval and use of vehicle data in connection with the sale of a used vehicle, and more specifically, to a system and methodology which allows owners of automotive diagnostic tools to scan vehicles owned by third parties in exchange for a fee payable to the owner of the automotive diagnostic tool, and wherein data and information retrieved by the diagnostic tool may be used in connection with the sale of the vehicle.

2. Description of the Related Art

Modern vehicles incorporate one or more computers or electrical systems that monitor and facilitate operation of a vehicle. During use of the vehicle, operational data may be generated and stored on a vehicle computer. The data may be retrieved from the vehicle using a data acquisition and transfer device (DAT), which may be capable of analyzing the data locally on the device to provide a diagnostic assessment to the driver, or alternatively, the data may be transferred to a remote location, such as a diagnostic server, for diagnostic assessment.

Although DAT devices may be used by mechanics in repair shops, DAT devices are also commonly owned by do-it-yourselfers who have an interest in monitoring and repairing their own vehicle. Exemplary DAT devices may include the CarScan™ Mobile 1000 and the CarScan™ Diagnostics 5410, both of which are sold by Innova Electronics. The DAT devices may connect to the vehicle computer(s) via a diagnostic port on the vehicle.

The use of a DAT device on a vehicle allows for an assessment of the health of the vehicle, similar to an individual having a blood test done to evaluate their own health. Thus, for vehicle owners who also own a DAT device, the vehicle owner may routinely check the health of the vehicle by retrieving and analyzing the vehicle data retrieved by the DAT device.

Although a DAT device may provide extremely useful information to the vehicle owner, the frequency with which the DAT device is used may be very low. For instance, many owners of DAT devices may use their DAT device only 2-3 times over the course of a given year. Thus, there may be a desire on the part of DAT device owners to use their device more frequency, perhaps as a for-pay service to third party vehicle owners, to generate additional income. However, to-date, there does not exist a forum or marketplace which allows DAT device owners to connect with other individuals desiring a scan of their vehicle. Furthermore, existing DAT devices, particularly those intended for sale to individuals, may be associated with limitations on the number of vehicles that may be scanned by a particular DAT device for purposes of generating a diagnostic report.

While the health and safety of a vehicle may be of interest to the owner of a vehicle, those in the market for a used car may also have an interest in the health and safety of any vehicle they may be considering. Indeed, some used-car shoppers may hire a mechanic to evaluate a vehicle prior to making an offer on the vehicle. Therefore, to appeal to possible buyers, an individual vehicle owner may also be interested in retrieving data from the vehicle to identify existing defects, possible fixes that may be performed, and the part/labor cost to make any needed repairs, prior to listing/purchasing the vehicle, or to provide, in the vehicle listing, an objective assessment as to the good health of the vehicle. However, it is unlikely that such an individual may purchase a DAT device for the sole purpose of retrieving vehicle data prior to selling or purchasing the vehicle.

Accordingly, there is a need in the art for system which connects owners of DAT devices to individuals desiring to have diagnostic data from their vehicle retrieved, such as vehicle owners. Various aspects of the present disclosure address this particular need, as will be discussed in more detail below.

BRIEF SUMMARY

Various aspects of the present disclosure are directed toward systems and methods which leverage the large number of data acquisition and transfer (DAT) devices owned by individuals and companies to retrieve diagnostic data from vehicles owned by third parties. The systems and methods may coordinate the connection of existing DAT owners with vehicle owners, scheduling a scan, performing a diagnostic analysis of the retrieved vehicle data, and using any data or derived diagnostic information therefrom on a listing for selling the vehicle, which may enable a potential purchaser to access additional information relating to a listed vehicle.

One particular aspect of the present disclosure may pertain to a methodology related to the collection of data (e.g., a vehicle report from a previous vehicle scan) for generating or building a listing of one or more vehicles for sale on an online marketplace. Along these lines, in accordance with one embodiment, the associated methodology includes receiving a plurality of vehicle data sets at a diagnostic server, with each vehicle data set being retrieved from a respective vehicle. Each data set is analyzed at the diagnostic server to generate a plurality of diagnostic reports, with each diagnostic report being associated with a respective one of the plurality of data sets. A unique electronic identifier is assigned to each diagnostic report and may be used for subsequent access or retrieval of the associated diagnostic report when building a sales listing in connection with the associated vehicle. A plurality of requests are received at a sales server to list a plurality of vehicles for sale on an online forum hosted at the sales server. The sales server is in operative communication with the diagnostic server. At least one of the plurality of requests includes a corresponding unique electronic identifier previously assigned to a corresponding diagnostic report. A plurality of electronic listings are created on the online forum, with each electronic listing being associated with a received request. For the at least one of the plurality of requests including the corresponding unique electronic identifier previously associated to the corresponding diagnostic report, the method further includes creating a link to the diagnostic report associated with the unique identifier on the corresponding electronic listing.

Each vehicle data set may be retrieved by one of a plurality of data acquisition and transfer (DAT) devices. Each DAT device may be associated with a unique user account. The method may also include mapping the at least one unique electronic identifier included in the received request to the unique user account associated with the DAT device that retrieved the vehicle data set associated with the diagnostic report to which the unique electronic identifier was assigned.

Each diagnostic report generated in the analyzing step may include information regarding received diagnostic trouble codes, freeze frame data, and/or other vehicle information derived therefrom.

Each diagnostic report generated in the analyzing step may include at least one predictive diagnostic assessment regarding a likely future vehicle condition.

The method may additionally include the step of creating a link on at least one electronic listing to purchase a repair part associated with the diagnostic report.

The method may further comprise the step of creating a link on at least one electronic listing to enable scheduling a repair service associated with the diagnostic report.

The method may also include the step of creating a link on at least one electronic listing to enable purchasing an extended warranty for the corresponding vehicle being tested or listed for sale. The terms of the extended warranty may be based on the diagnostic report associated with the corresponding vehicle for sale.

According to another aspect of the present disclosure, there is provided a system for automotive diagnostic analysis in connection with the sale of a vehicle. The system includes a first server (e.g., a tool owner server) having a plurality of tool owner profiles stored thereon. Each tool owner profile includes contact information and an electronic identifier associated with a data acquisition and transfer (DAT) device associated with each tool owner. A scheduling server is in operative communication with the first server. The scheduling server is configured to receive a request for diagnostic analysis from a vehicle owner, with the request including scheduling information including a vehicle identification information and location information of a vehicle needing analysis. The scheduling server may additionally be configured to access the first server to identify contact information for at least one tool owner in response to receiving the request. The scheduling server may further transmit a scheduling signal (e.g., a tool owner solicitation signal) to the identified at least one tool owner, receive an accept signal from the at least one tool owner, and send the scheduling information to the at least one tool owner in response to receiving the accept signal.

The scheduling information may include a vehicle location. The scheduling server may be further configured to identify the at least one tool owner based on proximity of the tool to the location information. The proximity of the tool or tool owner may be determined based on the contact information associated with the tool owner(s). Alternatively, to proximity of the tool may be determined based on a GPS signal received from a handheld electronic device associated with the tool owner.

The system may additionally include a diagnostic server in communication with the first server. The diagnostic server may be configured to receive sets of vehicle data retrieved from a plurality of DAT devices, and generate a diagnostic report for each set of vehicle data received at the diagnostic server. For each set of vehicle data received at the diagnostic server, the diagnostic server or the first server may be configured to identify the vehicle under test, and which DAT device retrieved the set of vehicle data. The diagnostic server or the first server may identify the DAT device based on DAT electronic identification information received at the diagnostic server or the first server from the DAT device.

According to another embodiment, there is provided a system for use with a handheld electronic device for coordinating retrieval of diagnostic information from a vehicle. The system includes computer readable instructions downloadable onto the handheld electronic device for configuring the handheld electronic device to receive a request signal from a scheduling server. The request signal includes vehicle information of a third-party vehicle for which retrieval of diagnostic information has been requested. The computer readable instructions further configure the handheld electronic device to display information related to the received request signal on the handheld electronic device and receive user input representative of the user agreeing to retrieve the diagnostic information from the third-party vehicle. The computer readable instructions additionally configure the handheld electronic device to send an accept signal to the scheduling server in response to receipt of the user input.

The computer readable instructions further configure the handheld electronic device to facilitate communications between the handheld electronic device and a data acquisition and transfer (DAT) device.

The computer readable instructions may also configure the handheld electronic device to relay information between the DAT device and a remote server.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

The detailed description set forth below in connection with the appended drawings is intended as a description of certain embodiments of a method and system of obtaining vehicle data in connection with the sale of the vehicle and is not intended to represent the only forms that may be developed or utilized. The description sets forth the various structure and/or functions in connection with the illustrated embodiments, but it is to be understood, however, that the same or equivalent structure and/or functions may be accomplished by different embodiments that are also intended to be encompassed within the scope of the present disclosure. It is further understood that the use of relational terms such as first and second, and the like are used solely to distinguish one entity from another without necessarily requiring or implying any actual such relationship or order between such entities.

Various aspects of the present disclosure relate to a system which allows individuals owning data acquisition and transfer (DAT) devices, such as scan tools, code readers, dongles, etc. (collectively "tool owners") to leverage their DAT devices to generate supplemental income by using their tools for third parties interested in selling their vehicle ("vehicle owners"). The systems and methods allow the tools owners to interact with the vehicle owners to scan the vehicles to retrieve vehicle data, and then use the retrieved vehicle data to create a listing on an online marketplace for selling the vehicle.

The tool owners may benefit by gaining more value out of their tool. More specifically, rather than using their tool only a handful of times each year on their own vehicle, as is often the case with most tool owners, the tool owner can use the tool on a more frequent basis to scan the vehicles of the vehicle owners. The tool owners may earn money for each use of their tool when scanning third party vehicles.

Vehicle owners may benefit by having enhanced access to vehicle diagnostic tools and associated vehicle diagnostic methods. As such, vehicle owners interested in selling their vehicle may obtain a more objective assessment as to the health of their vehicle through the use of the various methods described herein. Having a more detailed vehicle listing may eliminate uncertainty in the eyes of the buyer, which may allow for a higher selling price and/or a quicker transaction.

Figure 1:
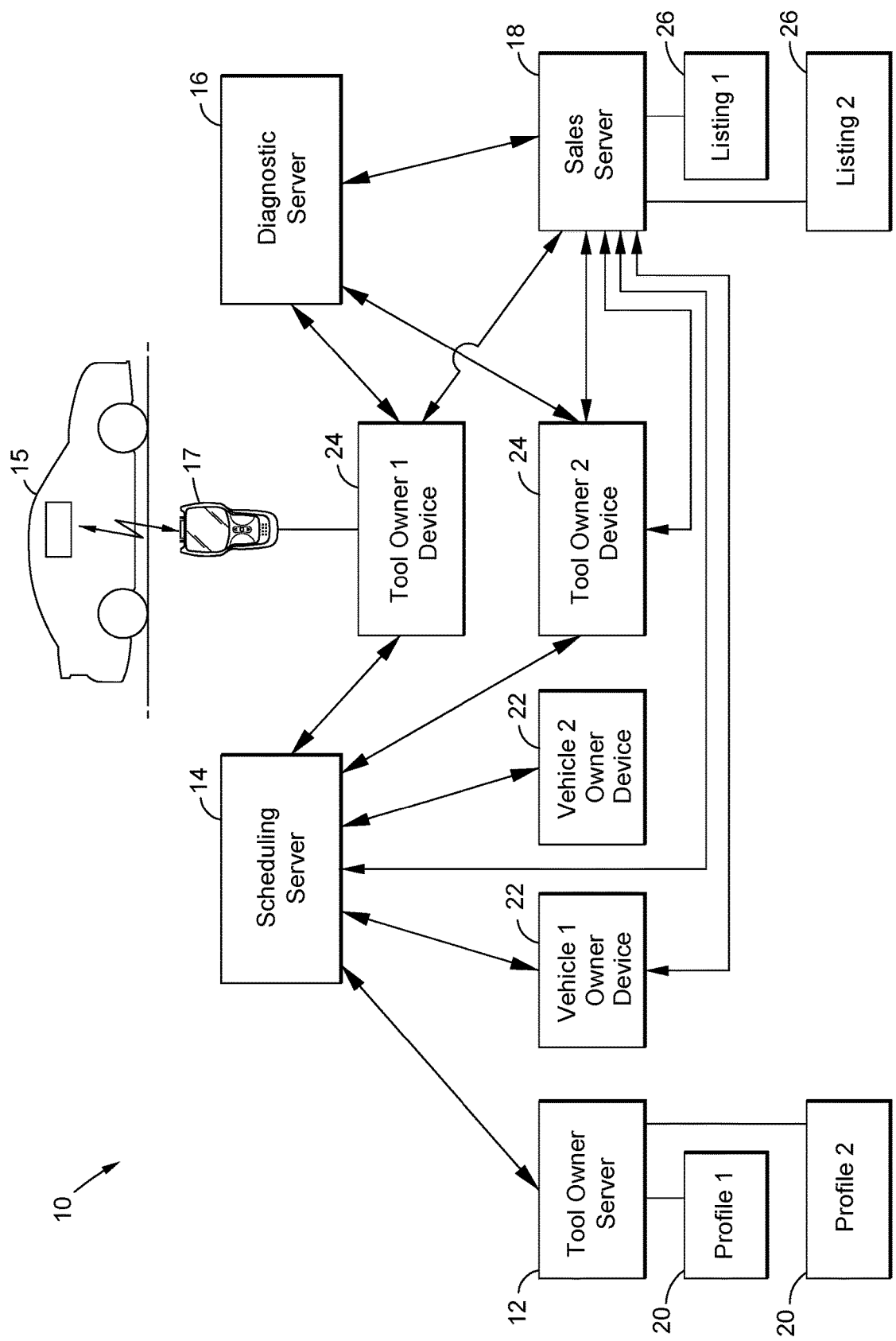
FIG. 1 is a schematic overview of a system which coordinates diagnostic scanning of a vehicle in connection with selling the vehicle.

Referring now to FIG. 1, there is depicted a general architecture of a system 10 generally including a tool owner server 12, a scheduling server 14, a diagnostic server 16, and a sales server 18. In the example depicted in FIG. 1, the system 10 is used to facilitate scanning of vehicle 15 owned by a third-party using DAT device 17 owned by a Tool Owner 1.

The tool owner server 12 includes a database of several tool owner profiles 20 of tool owners that have registered with the system 10. Each tool owner profile 20 may include information regarding the owner's tool 17, such as the diagnostic capabilities of the tool 17, as well as an electronic identifier associated with the tool 17. The diagnostic capabilities of the tool 17 may refer to vehicles with which the tool 17 is capable of communicating, vehicle systems with which the tool 17 is capable of communicating, communication protocols in which the tool 17 may communicate, diagnostic routines the tool 17 is capable of executing, any accessories the tool owner owns that may be operable with the tool 17. Along these lines, the tool owner may purchase one or more licenses or permissions to access enhanced diagnostic communications protocols, or to allow for an increase in the number of vehicles that the tool 17 may communicate with. In this regard, the tool 17 may be sold with the intention of being used by single owner in connection with the vehicle owners privately owned vehicles. As such, the tool 17, or a remote server communicating with the tool 17, may be preprogrammed to limit the number vehicles with which the tool 17 may be used. Thus, if the user desires to use the tool 17 in an increased capacity, the tool owner may purchase a license or other enhanced permission to expand the allowable use of the tool 17.

Each tool owner profile 20 may also include contact information of the tool owner, such as full name, physical address, phone number, email address, etc. The tool owner may also provide bank account information (e.g., routing number account number) or other mobile payment services (e.g., Venmo™, PayPal™, etc.) to allow for receipt of payment in exchange for performing vehicle scans, as will be explained in more detail below.

The scheduling server 14 is in communication with the tool owner server 12, as well as one or more vehicle owner devices 22 (e.g., vehicle owner smartphone), and one or more tool owner devices 24 (e.g., tool owner smartphone). The scheduling server 14 may include software (e.g., computer readable/executable instructions) that facilitates receipt of diagnostic requests/scan requests from a vehicle owner device 24. In response to receiving those requests, the scheduling server 14 may identify which tool owners are capable of performing the diagnostic request and are within a geographic proximity to the vehicle owner. The identification may be done solely based on geography and/or based on other factors, such as the nature of the diagnostic request/desired capability of the requested diagnostic tool 17. The scheduling server 14 may also generate and send a request to one or more tool owner devices 22 to perform the requested scan, and then receive an acceptance signal from one of the tool owner devices 22. Once one acceptance signal is accepted, subsequent acceptance signals may be rejected or placed in an on-call/standby list. The scheduling server 14 may further coordinate scheduling of the diagnostic service, and sending a confirmation, and optional reminders, of the scheduled diagnostic service to both the tool owner and the vehicle owner.

The system 10 additionally includes a diagnostic server 16, which is in communication with one or more tool owner devices 24 (e.g., smartphones, DAT devices, etc.) to receive retrieved diagnostic data and information from the vehicle for diagnostic assessment. The diagnostic data and information may include, but is not limited to, diagnostic trouble codes (DTCs), live data, sensor data, vehicle identification information, or any other data or information retrievable from the vehicle, or derived therefrom. The diagnostic data and information may be analyzed to identify possible diagnostic issues with the vehicle, identify a most likely fix, identify possible predictive diagnostic issues (e.g., issues likely to occur in the future), or other diagnostic assessments known in the art. For more information related to the analysis of diagnostic data at the diagnostic server, please refer to the following U.S. patents, owned by Innova Electronic Corporation, which is also the owner of the present disclosure: U.S. Pat. No. 6,807,469, entitled AUTO DIAGNOSTIC METHOD AND DEVICE, U.S. Pat. No. 6,925,368, entitled AUTO DIAGNOSTIC METHOD AND DEVICE, U.S. Pat. No. 7,620,484, entitled AUTOMOTIVE MOBILE DIAGNOSTICS, U.S. Pat. No. 8,019,503, entitled AUTOMOTIVE DIAGNOSTIC AND REMEDIAL PROCESS, U.S. Pat. No. 8,370,018, entitled AUTOMOTIVE DIAGNOSTIC PROCESS, U.S. Pat. No. 8,909,416, entitled HANDHELD SCAN TOOL WITH FIXED SOLUTION CAPABILITY, U.S. Pat. No. 9,026,400, entitled DIAGNOSTIC PROCESS FOR HOME ELECTRONIC DEVICES, U.S. Pat. No. 9,177,428, entitled PREDICTIVE DIAGNOSTIC METHOD, U.S. Pat. No. 9,646,432, entitled HAND HELD DATA RETRIEVAL DEVICE WITH FIXED SOLUTION CAPABILITY, U.S. Pat. No. 10,643,403, entitled PREDICTIVE DIAGNOSTIC METHOD AND SYSTEM, U.S. Patent Application Pub. No. 2013/0297143, entitled METHOD OF PROCESSING VEHICLE DIAGNOSTIC DATA, U.S. Patent Application Pub. No. 2019/0304208, entitled SYSTEM AND METHOD FOR PROACTIVE VEHICLE DIAGNOSIS AND OPERATIONAL ALERT, and U.S. Patent Application Pub. No. 2019/0304213, entitled SYSTEM AND METHOD FOR PROACTIVE VEHICLE DIAGNOSIS AND OPERATIONAL ALERT, the entire contents of each of which is expressly incorporated herein by reference.

The system 10 additionally includes a sales server 16, which may be in communication with the diagnostic server 16, the scheduling server 14, as well as one or more tool owner devices 24 and/or one or more vehicle owner devices 22. The sales server 16 may receive a request to list a particular vehicle for sale, and then compile information associated with the vehicle to generate and display a listing 26 on an online marketplace for used vehicles. The request may be generated by the vehicle owner device 22 using the app. running on the vehicle owner device 22. In this regard, the app. may include a user interface that guides the vehicle owner through a process of obtaining needed information for the vehicle listing. Certain information may be received directly from the vehicle owner's profile, or alternatively, directly from the vehicle owner. For instance, the contact information of the vehicle owner may be retrieved from the scheduling server 14, or may be derived from information provided by the vehicle owner device 22. The request submitted to the sales server 16 may additionally include a corresponding unique electronic identifier previously assigned to a corresponding diagnostic report, which allows the sales server 16 to access the diagnostic report, which may be stored on the diagnostic server 16 or locally on the vehicle owner device 22. The vehicle owner may also upload pictures of the vehicle 15, as well as a description of the vehicle 15.

Figure 2:
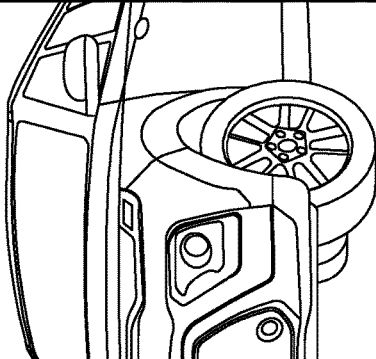
FIG. 2 is an exemplary listing of a vehicle for sale, with the listing including information derived from the vehicle data extracted from the vehicle.
Figure 3:
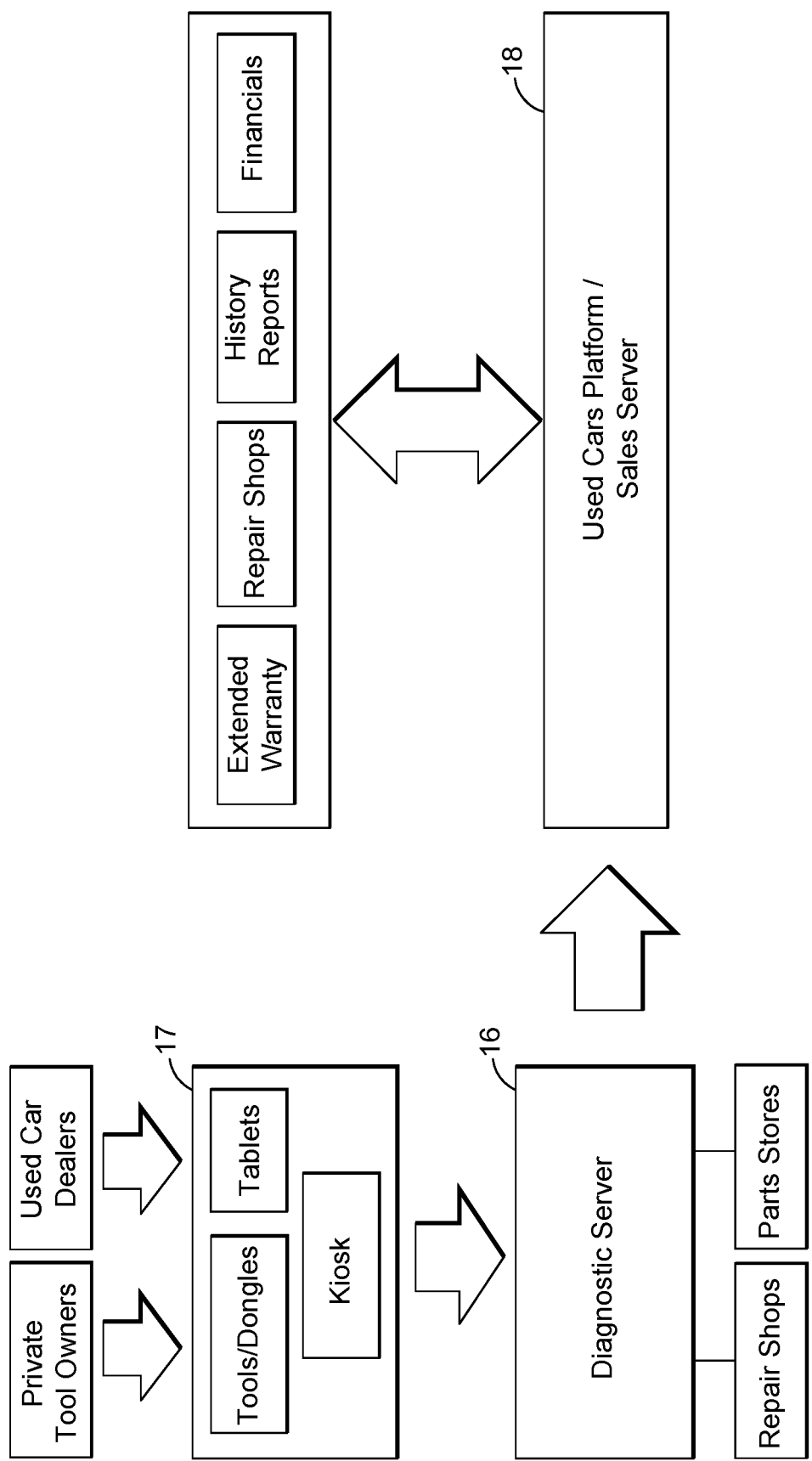
FIG. 3 is an exemplary schematic overview of flow of information among various entities included in the system.

Upon receiving the request, the sales server 16 may generate the listing 26 according to a template stored on the sales server 16. FIG. 2 is an exemplary listing of a vehicle offered for sale on an online marketplace, while FIG. 3 illustrates a flow or gathering of information that is used to generate the listing 26 on the online marketplace. The template may be associated with software running on the sales server 16 that compiles the information and formats the information for display on the online marketplace. For instance, the format of each listing 26 may include a field for vehicle photos, a field 28 for basic vehicle information including year, make, model, VIN, odometer reading, transmission type, and asking price. The listing format may additionally include an inspection summary 30 wherein certain information from the diagnostic report may be included, such as emissions testing results, diagnostic trouble code summary, anti-lock brake system status, and predictive diagnostics. A link to the full report may be provided in the listing 26.

The vehicle listing 26 may also include information or links that may be of particular interest to a potential used car buyer. For instance, information regarding a possible extended warranty may be accessible on the vehicle listing 26. The extended warranty may be provided by the operator of the used car marketplace, or by a third party. The terms of the extended warranty may be predicated, at least in part, on the diagnostic summary associated with the vehicle. For instance, if the diagnostic summary demonstrates that the vehicle is in overall good health, the extended warranty may be available for a relatively lessor cost and/or for a greater period of time. Conversely, if the diagnostic summary shows that the vehicle is in overall poor health, or is of a type that is commonly associated with more defects or high cost parts/labor, the extended warranty may be available for a relatively higher cost and/or for a lessor period of time. Thus, the ability to access and review the diagnostic report may allow for more vehicle-specific (e.g., subjective) extended warranty terms.

The listing 26 may additionally include information regarding one or more repair shops and one or more parts stores that may offer repair services or repair parts that may be needed from the vehicle. For instance, the diagnostic report may be reviewed and if repairs are needed now or in the near future, one or more repair shops and/or parts stores offering the needed repairs or parts may be identified. Furthermore, the listing 26 may include a link directly to the repair shop or parts store to see obtain an estimate for any needed vehicle specific repairs, future repairs, or parts. This information may be useful in determining the true cost of ownership of the vehicle over a defined period.

The listing 26 may further include links to vehicle history information, as well as financial information associated with the possible purchase of the vehicle. The vehicle history information may include any notable prior events associated with the vehicle, such as crashes and prior registration(s). The financial information may include lending that may be available for purchase of the vehicle.

Certain information presented in the listing 26 may be available at no cost, while other information on the listing 26, or accessible from the listing 26, may be available at an additional cost. For instance, an accident history, predictive diagnostics, estimate future parts and labor costs (e.g., estimated cost of ownership), etc., may be available or accessible at an additional cost. In most instances, these costs may be paid by the potential purchaser of the vehicle, although, it is contemplated that the seller of the vehicle may pay these costs to provide enhanced content in the listing 26 in an attempt to separate the listing 26 from other listings.

As noted above, the listing 26 may be part of an online marketplace that includes a plurality of listings 26. The online marketplace may be structured and arranged such that potential buyers may search that marketplace in several ways. For instance, a potential buyer may search for all vehicles listed for sale that fall within a specified category or categories. An exemplary search may be one where a potential purchaser is looking for all SUVs that are newer than 2017, with less than 50,000 miles, and are under $30,000. Potential buyers may also search by make, model, and engine, as well as vehicles that are listed for sale within a certain geographic region (e.g., within a certain number of miles from a specified zip code). If the potential buyer is also aware of a specific vehicle that is listed for sale, it may also be possible to search for the vehicle using the vehicle's VIN.

With the basic architecture of the system 10 having been described above, the following discussion pertains to various stages of using the system 10 to retrieve data from the vehicle and use information derived from the data on an online marketplace for selling the vehicle.

Registration of Tool Owners and Vehicle Owners

Various aspects of the present disclosure pertain to the ability of tool owners and vehicle owners to connect with each other using handheld electronic devices (e.g., smartphones, tablet computers, smart watches, etc.). Accordingly, both tool owners and vehicle owners may download an application ("app.") on one or more of their handheld electronic devices and complete an initial registration process. During the registration process, the tool owner may identify himself as a tool owner, and thus, have interest in receiving scan requests, while the vehicle owner may identify himself as a vehicle owner, and thus, have interest in sending scan requests. The information entered during the registration process may be stored locally on the tool owner smartphone, the vehicle owner smartphone, and/or stored at the tool owner server 12, scheduling server 14 or on a database accessible by the scheduling server 14.

Scheduling the Scan

Figure 4:
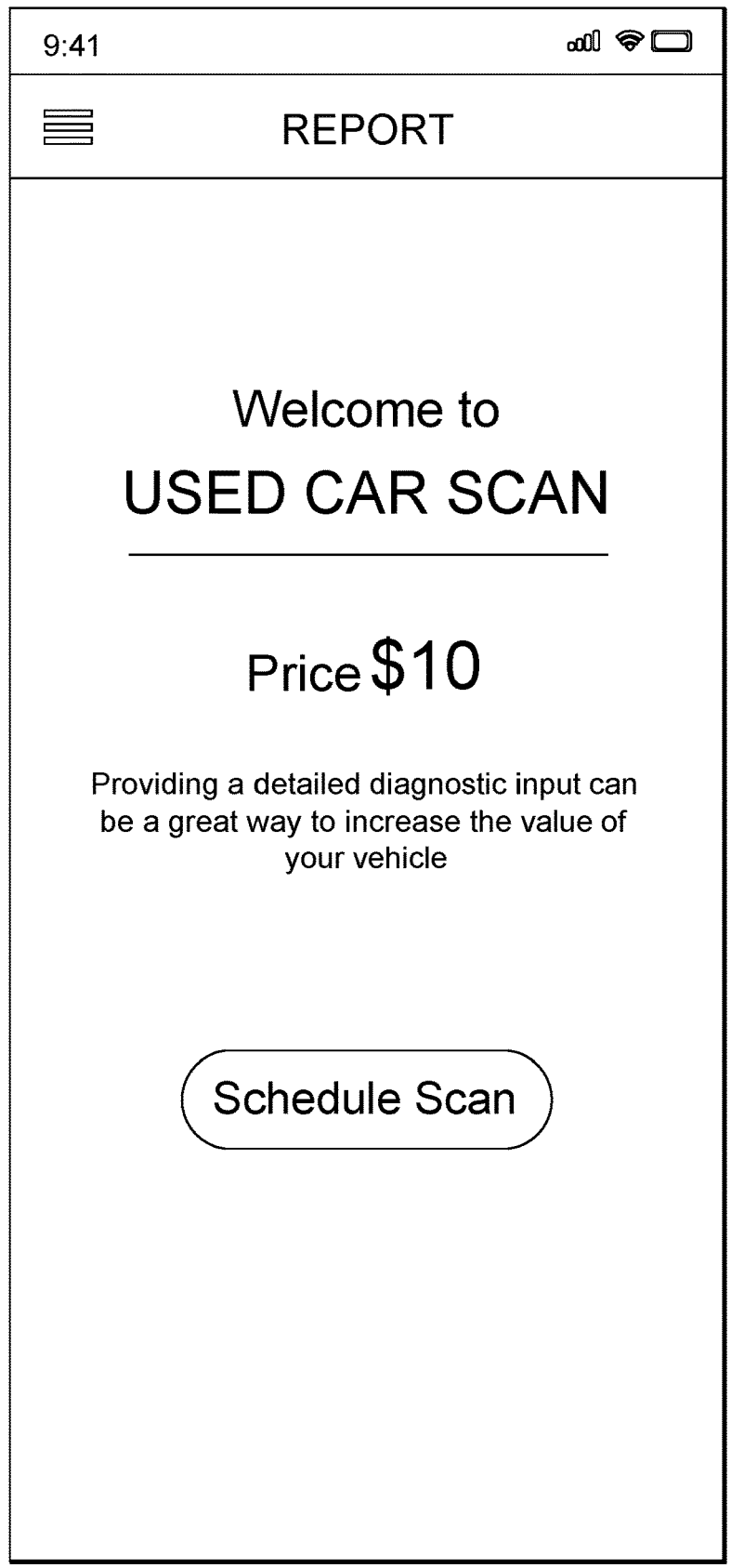
FIG. 4 is an exemplary screenshot of a handheld electronic device of a vehicle owner running an application for requesting a scan of a vehicle.

Using the app., the vehicle owner may indicate a need for a vehicle scan. For instance, and referring now to FIG. 4, the app. may include a button, such as "SCHEDULE SCAN." Upon pressing the button, the vehicle owner may be provided with an option to specify a location of the scan and/or a preferred time(s) for the scan. The location may be determined by using a GPS signal on the user's smartphone at the time the SCHEDULE SCAN button is pressed, or the user may enter a specific address for completing the scan. For instance, the user may enter a home address, or a more public address, such as the address of a public parking lot, etc.

Once all of the information is entered, a scan-request signal may be transmitted from the vehicle owner's smartphone and received at the scheduling server 14. The scan-request signal may include vehicle identification information (e.g., VIN or year, make, model, and engine), as well as the location of the vehicle, and a requested time-window for the scan to take place.

In response to receiving the scan-request signal, the scheduling server 14, may transmit a scan-needed signal to a network of registered tool owners via the tool-owner devices 24.

The tool owners who receive the scan-needed signal on their devices 24 may be within a predefined geographic area (e.g., 10 miles) relative to the where the vehicle needing a scan is located. Furthermore, certain tool owners may be registered to service specific types of vehicles. For instance, certain tool owners may have diagnostic software that allows for communication with vehicles that predate a certain year, or allows for retrieval of higher-level diagnostic information, the access of which may require the tool to be able to communicate in a specific communication protocol. As such, the vehicle information may also be used to identify the potential pool of tool owners to which the scan-needed signal may be sent.

The tool owners within the predefined geographic area which meet any predefined tool requirements may receive an alert on their smartphone 24, with the alert being indicative of a nearby scan request within a requested scan window. In response to receiving the alert, the smartphone 24 may display a general location of the requested scan, and the requested time(s) of the requested scan. The precise location of the requested scan may be hidden initially, to protect the privacy of the vehicle owner, and may only be provided upon acceptance by the tool owner.

When one tool owner agrees to perform the scan, the tool owner may provide such indication through the app. on the tool owner's phone. For instance, the display screen on the smartphone 24 may show an "ACCEPT" button or a "DECLINE" button. In particular, when the ACCEPT button is pressed, the app. may send an accept signal to the central scheduling server 14.

Upon receiving the accept signal, the central scheduling server 14 may generate a confirmation signal that is sent to the devices 22, 24 of the vehicle owner and the tool owner, with the scheduling particulars, e.g., contact information of both vehicle owner and tool owner, vehicle information, and time and location of scan. The scheduling server 14 may send a reminder to the devices 22, 24 of both the tool owner and the vehicle owner prior to the scheduled scan. It is also possible that both the tool owner and the vehicle owner can message each other through the app.

Scanning the Vehicle

Figure 5:
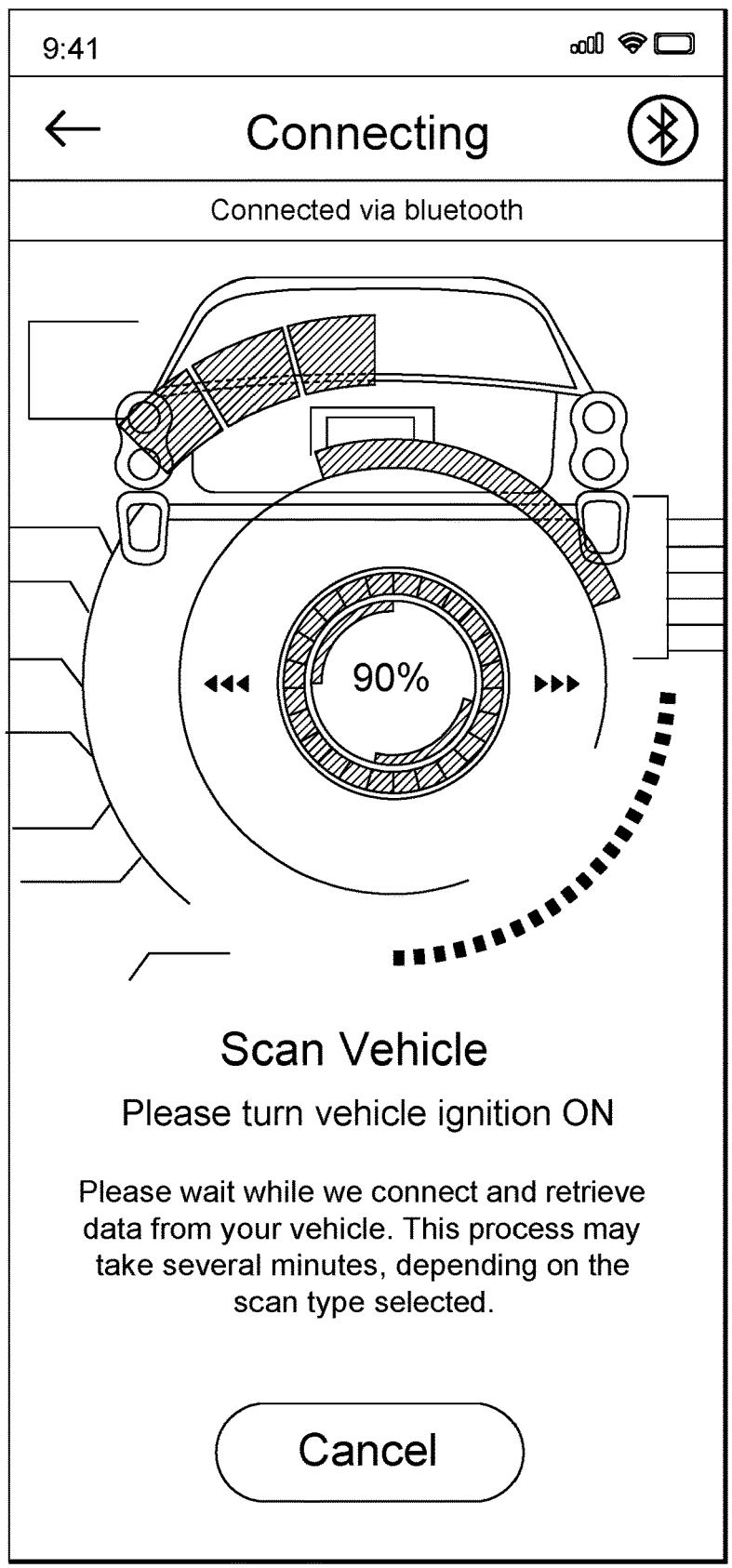
FIG. 5 is an exemplary screenshot of a handheld electronic device of a tool owner running an application for scanning a third party vehicle.
Figure 6:
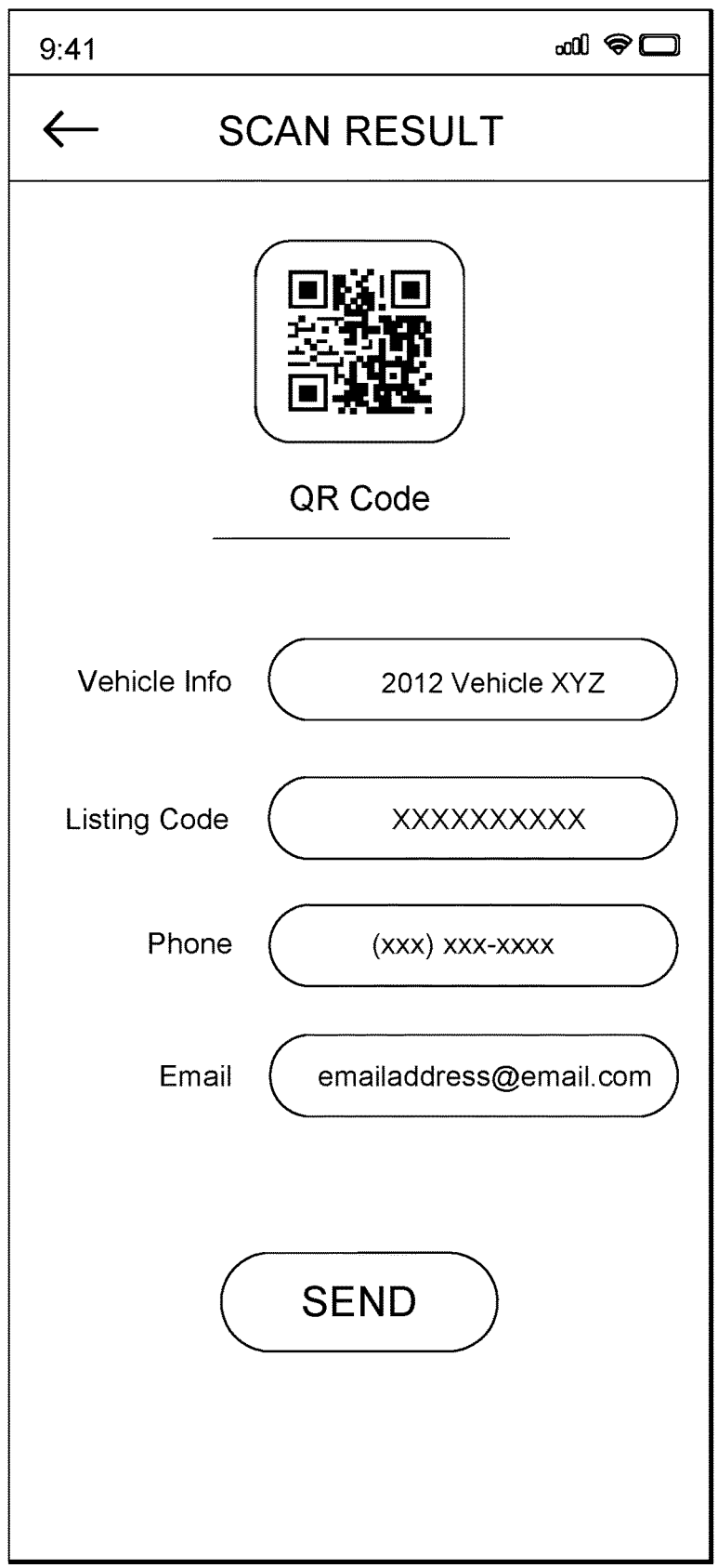
FIG. 6 is an exemplary screenshot of a handheld electronic device having received information for accessing a diagnostic report.

When the tool owner is at the vehicle, the tool owner uses their tool 17 to retrieve a set of data from the vehicle 15 and upload the retrieved data set to a diagnostic database. FIG. 5 shows a snapshot of the app. running on the tool owner's device 24 and possibly the vehicle owner's device 22 during the scan. The uploaded information may not only include the vehicle data set, but may also include tool identifying information, which allows the system to track which tool extracted the vehicle data. The tool identifying information may include an electronic tool ID extractable from the tool 17, or assigned by the system, during initial registration. The electronic tool ID may be used to track use of the tool 17 to provide the tool owner with a credit or payment for use of the tool 17. It is contemplated that credit or payment may be earned upon upload of the vehicle data to the database, or receipt of the corresponding diagnostic report by the vehicle owner. In this regard, the vehicle owner may pay the tool owner for use of the tool 17 to facilitate the scan of the vehicle.

Use of Uploaded Information

The vehicle information is analyzed at the diagnostic database to generate a diagnostic report, which may include a listing of retrieved DTCs, live data, sensor data, a most likely fix, repair parts, listings for the repair parts and/or repair services at a local store/shop, or through an e-commerce site (e.g., Amazon).

Upon generation of the diagnostic report, a unique report identifier may be assigned to the diagnostic report by the diagnostic server for later retrieval. The unique report identifier may be an alphanumeric code, or other digital identification code known in the art. The diagnostic report, or access information associated therewith may be sent to the vehicle owner and/or the tool owner.

The vehicle owner may review the diagnostic report and decide to include the diagnostic report in a vehicle listing for selling the vehicle. Accordingly, information from the diagnostic report may be included in the vehicle listing and the full report may be made accessible by a link included in the listing. The vehicle owner may be charged a fee for generating the vehicle listing on the online marketplace. The fee may be a one-time fee, or may be a fee that covers the listing for a specific period of time (e.g., one week, one month, one quarter, etc.).

The Vehicle Listing

The vehicle listing 26 may include the standard information (photos, vehicle info., mileage) as well as several features related to the diagnostic scan: Diagnostic Summary, Predictive Diagnostics, Replacement Parts, Repair Services, Extended Warranty, etc. The listing 26 may include an option to contact the tool owner before or after the sale to conduct another scan of the vehicle to verify the accuracy of the listing. The completion of the sale may be predicated on the verification of the information included in the vehicle listing 26. In this regard, the listing 26 may include an option which may allow the potential buyer to coordinate with a tool owner to scan the vehicle to verify the information provided on the listing. The procedures associated with facilitating coordination between the potential buyer and the tool owner may be similar to those described above in relation to the vehicle seller and the tool owner. For more information regarding providing diagnostic information in connection with the sale of pre-owned vehicles, please refer to U.S. Pat. No. 8,032,419 entitled Method of Providing Diagnostic Information in Connection with the Sale of Pre-Owned Vehicles, also owned by Innova Electronics Corporation, the contents of which are expressly incorporated herein by reference.

The particulars shown herein are by way of example only for purposes of illustrative discussion, and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A method of listing a plurality of vehicles for sale, the method comprising the steps of:
   receiving, at a scheduling server, a plurality of scan request signals from a plurality of vehicle owner electronic devices to schedule scans of a plurality of vehicles associated with the plurality of vehicle owner electronic devices, each vehicle defining a diagnostic function requirement for implementing a diagnostic function on the vehicle, each scan request signal being associated with GPS data;
   identifying a plurality of data acquisition and transfer devices (DATs) from a database of DATs that meet the diagnostic function requirements for each of the plurality of vehicles and are located within a predetermined region associated with the GPS data of the scan request signal;
   generating, at the scheduling server, in response to receipt of each of the plurality of scan request signals, a tool owner solicitation signal for receipt by a plurality of tool operators having DATs that are identified as meeting the diagnostic function requirements of the plurality of vehicles and are within the predetermined region;
   receiving a plurality of vehicle data sets from the plurality of DATs at a diagnostic server, each vehicle data set being retrieved from a respective vehicle;
   analyzing each data set at the diagnostic server to generate a plurality of diagnostic reports, each diagnostic report being associated with a respective one of the plurality of data sets;
   assigning a unique electronic identifier to each diagnostic report;
   receiving a plurality of requests at a sales server to list a plurality of vehicles for sale on an online forum hosted at the sales server, the sales server being in operative communication with the diagnostic server, at least one of the plurality of requests including a corresponding unique electronic identifier previously assigned to a corresponding diagnostic report;
   creating a plurality of electronic listings on the online forum, each electronic listing being associated with a received request and being created from a template; and
   for the at least one of the plurality of requests including the corresponding unique electronic identifier previously associated to the corresponding diagnostic report, the method further including creating a link to the diagnostic report associated with the unique identifier on the corresponding electronic listing.

2. The method recited in claim 1, wherein each DAT device is associated with a unique user account, the method further comprising the step of:
   mapping the at least one unique electronic identifier included in the received request to the unique user account associated with the DAT device that retrieved the vehicle data set associated with the diagnostic report to which the unique electronic identifier was assigned.

3. The method recited in claim 1, wherein each diagnostic report generated in the analyzing step includes information regarding received diagnostic trouble codes.

4. The method recited in claim 1, wherein each diagnostic report generated in the analyzing step includes at least one predictive diagnostic assessment.

5. The method recited in claim 1, further comprising the step of creating a link on at least one electronic listing to purchase a repair part associated with the diagnostic report.

6. The method recited in claim 1, further comprising the step of creating a link on at least one electronic listing to schedule a repair service associated with the diagnostic report.

7. The method recited in claim 1, further comprising the step of creating a link on at least one electronic listing to purchase an extended warranty for the corresponding vehicle for sale.

8. The method of claim 7, where the terms of the extended warranty are based on the diagnostic report associated with the corresponding vehicle for sale.

9. A method of listing a plurality of vehicles for sale, the method comprising the steps of:
   receiving, at a scheduling server, a plurality of scan request signals from a plurality of vehicle owner electronic devices to schedule scans of a plurality of vehicles associated with the plurality of vehicle owner electronic devices, each vehicle defining a diagnostic function requirement for implementing a diagnostic function on the vehicle, each scan request signal being associated with GPS data;
   identifying a plurality of data acquisition and transfer devices (DATs) from a database of DATs that meet the diagnostic function requirements for each of the plurality of vehicles and are located within a predetermined region associated with the GPS data of the scan request signal;
   generating, at the scheduling server, in response to receipt of each of the plurality of scan request signals, a tool owner solicitation signal for receipt by a plurality of tool operators having DATs that are identified as meeting the diagnostic function requirements of the plurality of vehicles and are within the predetermined region;
   assigning a unique electronic identifier to each of a plurality of diagnostic reports subsequent to generating the tool owner solicitation signal;
   receiving a plurality of requests at a sales server to list a plurality of vehicles for sale on an online forum hosted at the sales server, the sales server being in operative communication with a diagnostic server, at least one of the plurality of requests including a corresponding unique electronic identifier previously assigned to a corresponding diagnostic report;
   creating a plurality of electronic listings on the online forum, each electronic listing being associated with a received request and being created from a template; and
   for the at least one of the plurality of requests including the corresponding unique electronic identifier previously associated to the corresponding diagnostic report, the method further including creating a link to the diagnostic report associated with the unique identifier on the corresponding electronic listing.

10. The method recited in claim 9, wherein each diagnostic report is associated with a respective one of a plurality of vehicle data sets, each vehicle data set being retrieved by one of the plurality of DATs, each DAT device being associated with a unique user account, the method further comprising the step of:

mapping the at least one unique electronic identifier included in the received request to the unique user account associated with the DAT device that retrieved the vehicle data set associated with the diagnostic report to which the unique electronic identifier was assigned.

11. The method recited in claim 9, wherein each diagnostic report is derived from received diagnostic trouble codes.

12. The method recited in claim 9, wherein each diagnostic report includes at least one predictive diagnostic assessment.

13. The method recited in claim 9, further comprising the step of creating a link on at least one electronic listing to purchase a repair part associated with the diagnostic report.

14. The method recited in claim 9, further comprising the step of creating a link on at least one electronic listing to schedule a repair service associated with the diagnostic report.

15. The method recited in claim 9, further comprising the step of creating a link on at least one electronic listing to purchase an extended warranty for the corresponding vehicle for sale.

16. The method of claim 15, where the terms of the extended warranty are based on the diagnostic report associated with the corresponding vehicle for sale.

17. A method of listing a vehicle for sale, the method comprising the steps of:

receiving, at a scheduling server, a plurality of scan request signals from a plurality of vehicle owner electronic devices to schedule scans of a plurality of vehicles associated with the plurality of vehicle owner electronic devices, each vehicle defining a diagnostic function requirement for implementing a diagnostic function on the vehicle, each scan request signal being associated with GPS data;

identifying a plurality of data acquisition and transfer devices (DATs) from a database of DATs that meet the diagnostic function requirements for each of the plurality of vehicles and are located within a predetermined region associated with the GPS data of the scan request signal;

generating, at the scheduling server, in response to receipt of each of the plurality of scan request signals, a tool owner solicitation signal for receipt by a plurality of tool operators having DATs that are identified as meeting the diagnostic function requirements of the plurality of vehicles and are within the predetermined region;

receiving a vehicle data set at a diagnostic server, the vehicle data set being retrieved from a vehicle subsequent to generating the tool owner solicitation signal;

analyzing the data set at the diagnostic server to generate a diagnostic report, the diagnostic report being associated with the data set;

assigning a unique electronic identifier to the diagnostic report;

receiving a request at a sales server to list the vehicle for sale on an online forum hosted at the sales server, the sales server being in operative communication with the diagnostic server, the request including the unique electronic identifier previously assigned to the diagnostic report;

creating an electronic listing on the online forum, the electronic listing being associated with the received request and being created from a template; and creating a link to the diagnostic report associated with the unique identifier on the corresponding electronic listing.

18. The method recited in claim 17, wherein the vehicle data set is retrieved by the DAT being associated with a unique user account, the method further comprising the step of:

mapping the unique electronic identifier included in the received request to the unique user account associated with the DAT device that retrieved the vehicle data set associated with the diagnostic report to which the unique electronic identifier was assigned.

19. The method recited in claim 17, wherein the diagnostic report generated in the analyzing step includes information regarding received diagnostic trouble codes.

20. The method recited in claim 17, wherein the diagnostic report generated in the analyzing step includes at least one predictive diagnostic assessment.

* * * * *